(12) United States Patent
Healy et al.

(10) Patent No.: US 8,573,363 B2
(45) Date of Patent: Nov. 5, 2013

(54) APPARATUS FOR GUIDING A VEHICLE ONTO A SERVICE LIFT USING A MACHINE VISION WHEEL ALIGNMENT SYSTEM

(75) Inventors: Donald A. Healy, Conway, AR (US); Carl W. Pruitt, Conway, AR (US)

(73) Assignee: Snap-on Incorporated, Kenosha, WI (US)

( * ) Notice: Subject to any disclaimer, the term of this patent is extended or adjusted under 35 U.S.C. 154(b) by 938 days.

(21) Appl. No.: 12/705,175

(22) Filed: Feb. 12, 2010

(65) Prior Publication Data

US 2011/0199232 A1     Aug. 18, 2011

(51) Int. Cl.
*B66F 7/28*     (2006.01)

(52) U.S. Cl.
USPC ............................ 187/216; 382/151; 356/155

(58) Field of Classification Search
USPC .................... 187/207, 210, 216–218, 277; 254/88–89 H; 248/352; 14/69.5, 71.3; 382/103, 104, 151; 33/203.18, 288, 33/277, 286; 356/153, 155
See application file for complete search history.

(56) References Cited

U.S. PATENT DOCUMENTS

| | | | |
|---|---|---|---|
| 2,979,694 A | | 4/1961 | Lamberti |
| 3,509,527 A | | 4/1970 | Oakes et al. |
| 4,338,027 A | * | 7/1982 | Eck .................. 356/155 |
| 4,920,596 A | * | 5/1990 | Stevens ............ 14/69.5 |
| 5,380,145 A | * | 1/1995 | Czaplewski ........ 414/537 |
| 5,716,040 A | * | 2/1998 | Torres ................ 254/88 |
| 5,724,743 A | * | 3/1998 | Jackson ............. 33/288 |
| 5,863,026 A | * | 1/1999 | Gano et al. ........ 254/88 |
| 8,220,779 B2 | * | 7/2012 | Schmuecker et al. ... 254/88 |
| 8,244,024 B2 | * | 8/2012 | Dorrance et al. ..... 382/151 |
| 8,267,626 B2 | * | 9/2012 | Claas et al. ........ 410/1 |
| 2005/0133309 A1 | * | 6/2005 | Liebetreu et al. ...... 187/211 |
| 2006/0228197 A1 | * | 10/2006 | Springwater .......... 414/231 |
| 2011/0182703 A1 | * | 7/2011 | Alan ................ 414/231 |

FOREIGN PATENT DOCUMENTS

WO     WO 2010/002968 A1     1/2010

OTHER PUBLICATIONS

International Search Report and Written Opinion issued in International Patent Application No. PCT/US2011/024218, dated Oct. 10, 2011.

* cited by examiner

*Primary Examiner* — Anthony Salata
(74) *Attorney, Agent, or Firm* — McDermott Will & Emery LLP

(57) ABSTRACT

An apparatus is provided for guiding a vehicle onto a service lift having a pair of runways for receiving the wheels of the vehicle. In one embodiment, a machine vision wheel alignment system including an image sensor, a processor, and a display provides a visual display of the vehicle and the runways to guide an operator of the vehicle to drive the vehicle wheels onto the runways. In other embodiments, a pair of runway targets and a vehicle target are viewed by a pair of image sensors of a machine vision wheel alignment system. Image signals from the image sensors are processed to determine respective positions of the runways and to monitor a position of the vehicle relative to the runways, and a visual reference is displayed to guide an operator of the vehicle.

11 Claims, 4 Drawing Sheets

200 - Service lift
205a, b - Runway
210 - Vehicle
210a, b - Vehicle wheel
215 - Machine vision wheel alignment system
220a, b - Image sensor
225 - Processor
230 - Monitor
235 - Switch

APPARATUS FOR GUIDING A VEHICLE ONTO A SERVICE LIFT USING A MACHINE VISION WHEEL ALIGNMENT SYSTEM

TECHNICAL FIELD

The present subject matter relates to automotive service systems, such as vehicle lifts and wheel alignment systems. The present disclosure has particular applicability to wheel alignment systems utilizing a drive-on rack or service lift.

BACKGROUND

Some current conventional vehicle wheel alignment systems use a computer-aided, three-dimensional (3D) machine vision alignment system. In such a system, one or more cameras view targets attached to the wheels of the vehicle. A computer in the alignment system analyzes the images of the targets to determine wheel position and alignment of the vehicle wheels from the wheel position data. The computer typically guides an operator to properly adjust the wheels for precise alignment, based on calculations obtained from processing of the image data. A wheel alignment system or aligner of this image processing type is sometimes called a "3D aligner." An example of a vehicle wheel aligner using such image processing is the Visualiner 3D or "V3D", commercially available from Snap-on Equipment of Conway, Ark., a division of Snap-on Incorporated.

In automotive service facilities, it is often necessary to raise the vehicle off the floor to a convenient height, so the technician has easy access to the underside of the vehicle (for example, to perform a wheel alignment). An automotive lift is commonly used for this purpose, having parallel tracks or runways which are hydraulically operated to raise the vehicle. The above-described machine vision wheel alignment systems typically include such a lift or "alignment rack" for positioning the vehicle relative to the cameras, and for allowing the technician to easily adjust the vehicle suspension components.

The technician must drive the vehicle onto the lift and position it correctly prior to beginning any work on the vehicle. At the lowest height, called the "drive-on height," the lift top surface is often 12 to 18 inches above floor level, so there is a danger to the vehicle and the technician if the vehicle is not sufficiently centered on the runways as it is driven on to the lift. Common solutions to this problem have been the use of a convex mirror to allow a view of the front of the vehicle, or a second technician standing in front of the vehicle as it is driven on the lift, to direct the driver. Disadvantageously, such methods are inefficient, inconvenient, and/or imprecise, because the driver guides the vehicle using a limited amount of information.

There exists a need for an apparatus/method to safely and quickly allow a technician to drive a vehicle onto a lift.

SUMMARY

The teachings herein provide methodologies for safely and efficiently guiding a vehicle onto a service lift using a light beam directed toward the vehicle to provide a visual reference for the vehicle operator, or using sensors built into the lift. Also disclosed are methodologies for safely and efficiently guiding a vehicle onto a service lift using a machine vision wheel alignment system.

According to the present disclosure, the foregoing and other advantages are achieved in part by an apparatus for guiding a vehicle onto a service lift having a pair of runways for receiving the wheels of the vehicle, the apparatus comprising a beam generator for generating a light beam and directing the light beam toward the vehicle along the lift center line between the runways, to provide a visual reference to guide an operator of the vehicle to drive the vehicle wheels onto the runways.

In accord with another aspect of the disclosure, an apparatus for guiding a vehicle onto a service lift comprises a machine vision wheel alignment system having a first image sensor mounted to view a target on a first wheel of the vehicle, a processor for receiving and processing a first image signal from the first image sensor, and a monitor operably connected to the processor. The processor is for processing the first image signal to generate a first image of a first portion of the vehicle and a first one of a pair of runways for receiving the wheels of the vehicle, and displaying the first image on the monitor, to provide a visual reference to guide an operator of the vehicle to drive the vehicle wheels onto the runways.

In accord with another aspect of the disclosure, an apparatus for guiding a vehicle onto a service lift comprises a pair of runway targets, each attached to one of the lift's runways for receiving the wheels of the vehicle; a vehicle target attached to the vehicle; and a machine vision wheel alignment system having a pair of image sensors for respectively viewing the pair of runway targets, wherein one of the image sensors is also for viewing the vehicle target. The machine vision alignment system also has a processor for receiving and processing image signals from the image sensors, and a monitor operably connected to the processor. The processor is for processing image signals resulting from the image sensors viewing the pair of runway targets to determine and store respective positions of the runways, for processing image signals resulting from the one of the image sensors viewing the vehicle target to monitor a position of the vehicle relative to the runways, and for causing the monitor to display a visual reference to guide an operator of the vehicle to drive the vehicle wheels onto the runways.

In accord with another aspect of the disclosure, an apparatus for guiding a vehicle onto a service lift comprises a plurality of sensors respectively attached to the lift's runways for generating a set of sensor signals responsive to a position of the vehicle relative to the runways; a processor for receiving and processing the sensor signals; and a monitor operably connected to the processor. The processor is for processing the sensor signals to determine and monitor the position of the vehicle relative to the runways, and for causing the monitor to display a visual reference to guide an operator of the vehicle to drive the vehicle wheels onto the runways.

Additional advantages and other features of the present disclosure will be set forth in part in the description which follows and in part will become apparent to those having ordinary skill in the art upon examination of the following or may be learned from the practice of the invention. The advantages of the disclosure may be realized and obtained as particularly pointed out in the appended claims.

BRIEF DESCRIPTION OF THE DRAWINGS

Reference is made to the attached drawings, wherein elements having the same reference numeral designations represent like elements throughout, and wherein.

DETAILED DESCRIPTION

The present methodology applies to safely and efficiently guiding a vehicle onto an automotive service lift.

Figure 1:
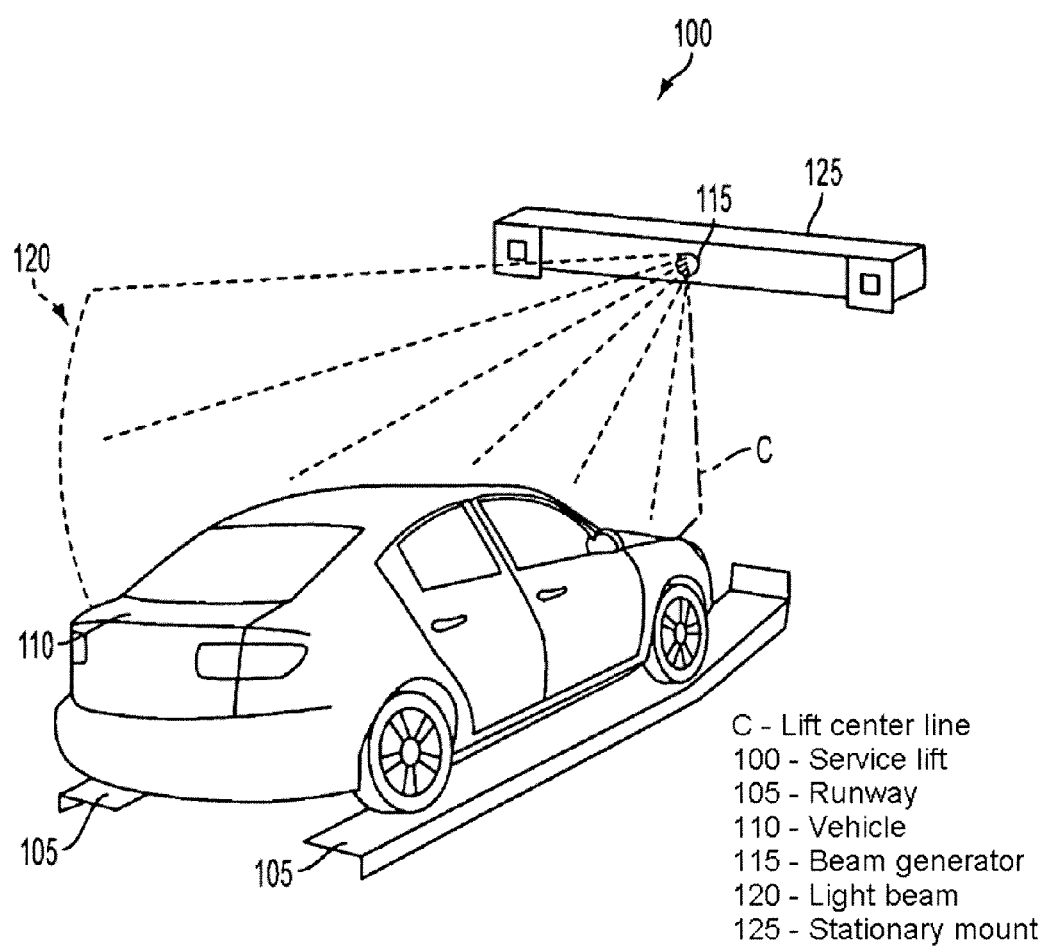
FIG. 1 diagrammatically illustrates an apparatus according to an embodiment of the present disclosure.

An apparatus according to an embodiment of the present disclosure will be described with reference to FIG. 1. A conventional service lift 100 has a pair of runways 105 for receiving the wheels of the vehicle 110. A beam generator 115 generates a light beam 120 and directs the light beam 120 toward the vehicle 110 along the lift center line C between the runways 105, to provide a visual reference to guide an operator of the vehicle 110 to drive the vehicle wheels onto the runways 105. In particular, as shown in FIG. 1, light beam 120 gives a visual reference line on the vehicle hood and windshield, so the driver of the vehicle can adjust the vehicle position as necessary to keep the line in the center of the vehicle as they drive onto the runways 105.

In certain embodiments, the beam generator 115 includes a conventional rotary laser generator mounted to a stationary mount 125 for generating light beam 120. Stationary mount 125 can be part of a wheel alignment system, such as a machine vision alignment system. In alternative embodiments of the disclosure, the beam generator 115 is for generating a laser light beam in a conventional manner, and comprises a collimator for forming the laser light beam 120 into a fan pattern, such as depicted in FIG. 1.

Figure 2:
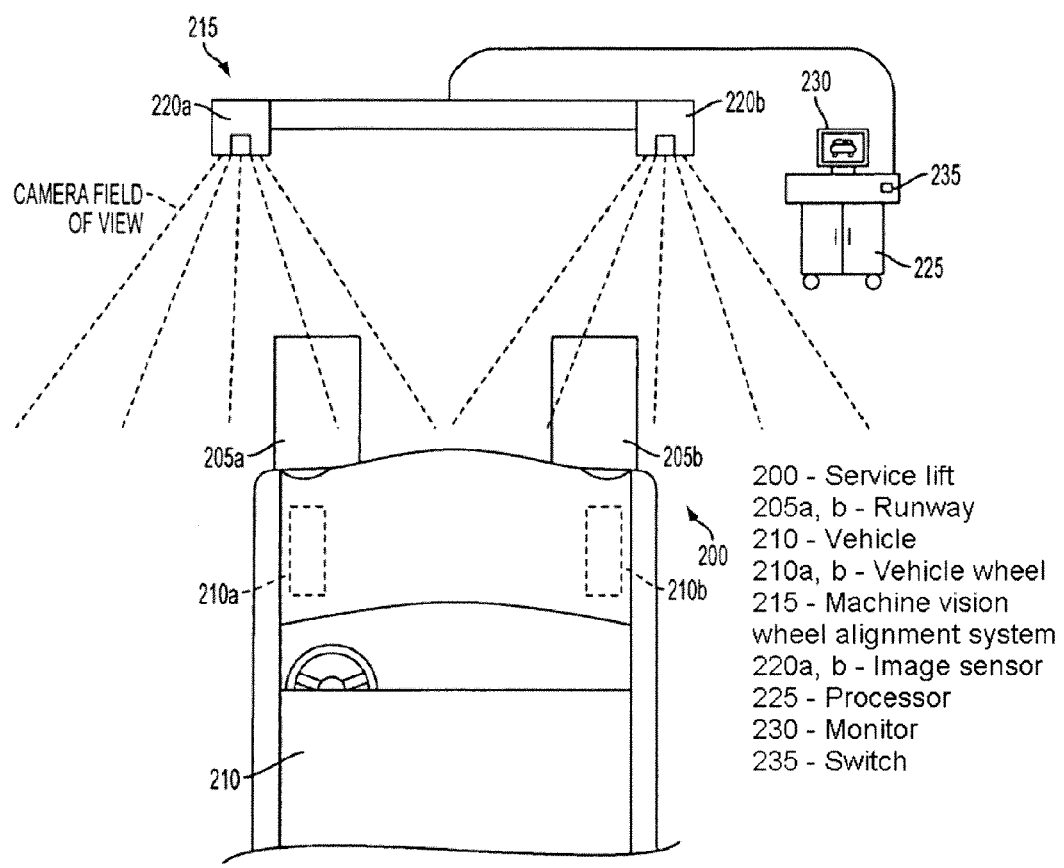
FIG. 2 diagrammatically illustrates an apparatus according to another embodiment of the present disclosure.

An apparatus according to another embodiment of the present disclosure will be described with reference to FIG. 2. A conventional service lift 200 has a pair of runways 205a, 205b for receiving the wheels of a vehicle 210. A machine vision wheel alignment system 215 has a first image sensor 220a, such as a camera, mounted in a conventional manner, to view a target (not shown) on a first wheel 210a of the vehicle 210, a first portion of the left half of vehicle 210, and the left runway 205a. Alignment system 215 also has a processor 225, such as a computer, for receiving and processing a first image signal from the first image sensor 220a, and a monitor 230, such as a conventional video monitor, operably connected to the processor 225.

The processor 225 processes the first image signal from first image sensor 220a to generate a first image of the first portion of the left half of vehicle 210 and of the left runway 205a, and displays the first image on the monitor 230, to provide a visual reference to guide an operator of the vehicle to drive the vehicle wheels onto the runways.

In other embodiments, the alignment system 215 comprises a second image sensor 220b, such as a camera, mounted to view a target (not shown) on a second wheel 210b of the vehicle 210 opposite the first wheel 210a, a second portion of the right half of vehicle 210, and the right runway 205b. Processor 225 is for processing a second image signal from the second image sensor 220b to generate a second image of the second portion of the right half of vehicle 210 and of the right runway 205b, and displaying the second image on the monitor 230. In certain embodiments, the processor 225 causes only one of the first and second images to appear on the monitor 230 at a time, and the apparatus further comprises a switch 235 for switching between display of the first and second images. In certain other embodiments, the processor 225 causes the first and second images to be displayed on the monitor 230 simultaneously.

Figure 3:
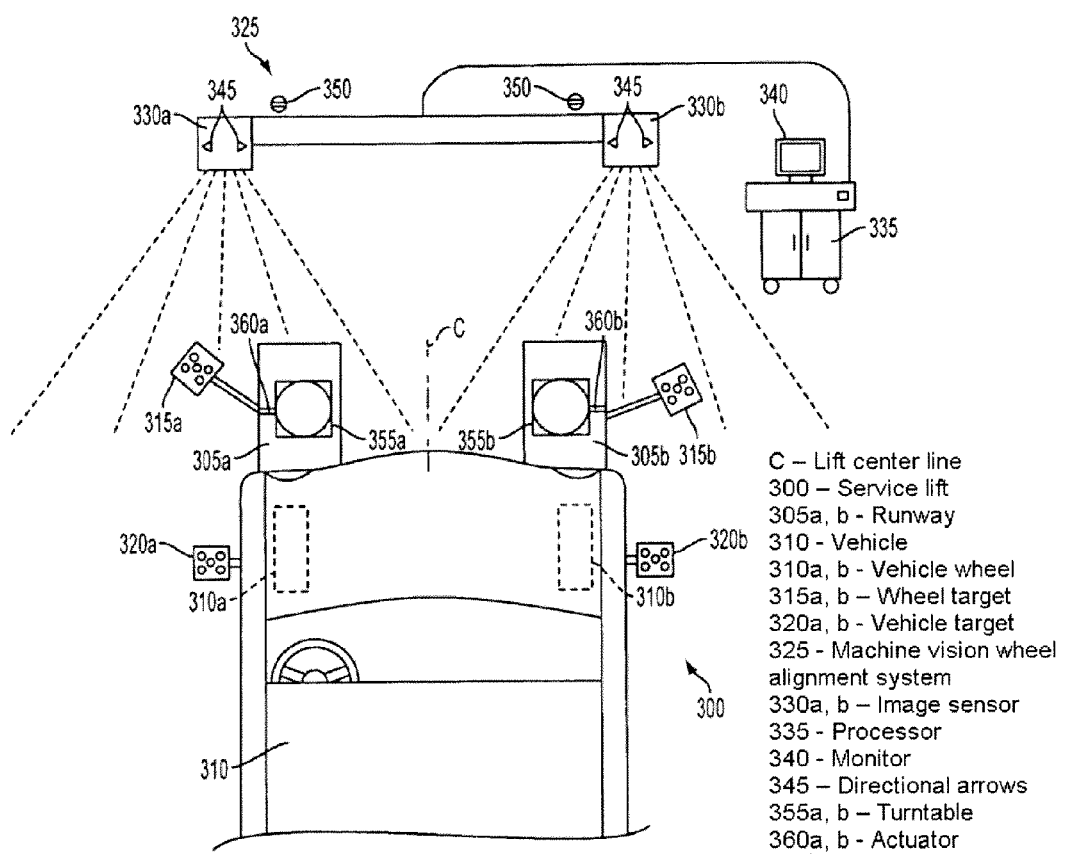
FIG. 3 diagrammatically illustrates an apparatus according to a further embodiment of the present disclosure.

An apparatus according to a further embodiment of the present disclosure will be described with reference to FIG. 3.

A conventional service lift 300 has a pair of runways 305a, 305b for receiving the wheels 310a, 310b of a vehicle 310. A pair of conventional runway targets 315a, 315b is attached to the runways 305a, 305b, and a conventional vehicle target 320a is attached to a part of the vehicle 310 other than a wheel. A machine vision wheel alignment system 325 has a pair of image sensors 330a, 330b for respectively viewing the pair of runway targets 315a, 315b, and one of the image sensors 330a is also for viewing the vehicle target 210a. Alignment system 325 also includes a processor 335, such as a computer, for receiving and processing image signals from the image sensors 330a, 330b, and a monitor 340, such as a conventional video monitor, operably connected to the processor 335.

The processor 335 processes image signals resulting from the image sensors 330a, 330b viewing the pair of runway targets 315a, 315b to determine and store respective positions of the runways 305a, 305b. Processor 335 also processes image signals resulting from image sensor 330a viewing the vehicle target 310a to monitor the position of the vehicle 310 relative to the runways 305a, 305b, and causes the monitor 340 to display a visual reference to guide an operator of the vehicle 310 to drive the vehicle wheels 310a, 310b onto the runways 305a, 305b.

In other embodiments, the apparatus includes a pair of vehicle targets 320a, 320b, and the pair of image sensors 330a, 330b is for respectively viewing the pair of vehicle targets. The processor 335 processes image signals from the pair of image sensors 330a, 330b viewing the pair of vehicle targets 320a, 320b to monitor the position of the vehicle 310 relative to the runways 305a, 305b.

In some embodiments, the visual reference displayed on the monitor 340 comprises graphical animations indicating the position of the vehicle relative to the runways. Alternatively, the visual reference displayed on the monitor 340 comprises a video image of the vehicle relative to the runways. In other embodiments, the visual reference displayed on the monitor 340 includes directional arrows for providing feedback to guide the operator to drive the vehicle wheels onto the runways.

In further embodiments, the image sensors 330a, 330b each include a vehicle orientation directional indicator having selectively illuminated directional arrows 345, and the processor 335 is for causing the directional arrows 345 to illuminate responsive to the position of the vehicle 310 relative to the runways 305a, 305b, for providing feedback to guide the operator. Other embodiments include sonic indicators 350, such as beepers or loudspeakers, operably connected to the processor 335, which causes the sonic indicators 350 to operate responsive to the position of the vehicle 310 relative to the runways 305a, 305b, for providing feedback to guide the operator, such as beeps or voice commands synthesized in a conventional manner by the processor 335.

Referring again to FIG. 3, in another embodiment of the present disclosure, each of the runways 305a, 305b comprises a conventional turntable 355a, 355b movably mounted thereto. The vehicle wheels 310a, 310b are driven onto the turntables 355a, 355b to allow a technician to turn the wheels to the left and right when performing a wheel alignment. Since different vehicles have different wheel tracks (i.e., the distance between the front wheels), the turntables must be adjusted to the left or right to align the turntables to the particular vehicle's wheels prior to the wheels being driven onto them.

In this embodiment, an actuator 360a, 360b, such as a conventional motor-driven screw drive actuator, is connected between each respective runway 305a, 305b and turntable 355a, 355b for moving the turntable relative to the runway to the left or right. The processor 335 controls the actuators 360a, 360b to move the turntables 355a, 355b responsive to the image signals such that the turntables are aligned with the vehicle wheels 310a, 310b. Those skilled in the art will appreciate that one way for the processor 335 to perform this function is for the processor to determine the position of the runways 305a, 305b and of the vehicle centerline C in a conventional manner (using image signals from the targets 315a, 315b, 320a, 320b), and then reference a stored vehicle wheel track for the particular vehicle 310 to adjust turntables 355a, 355b.

Figure 4:
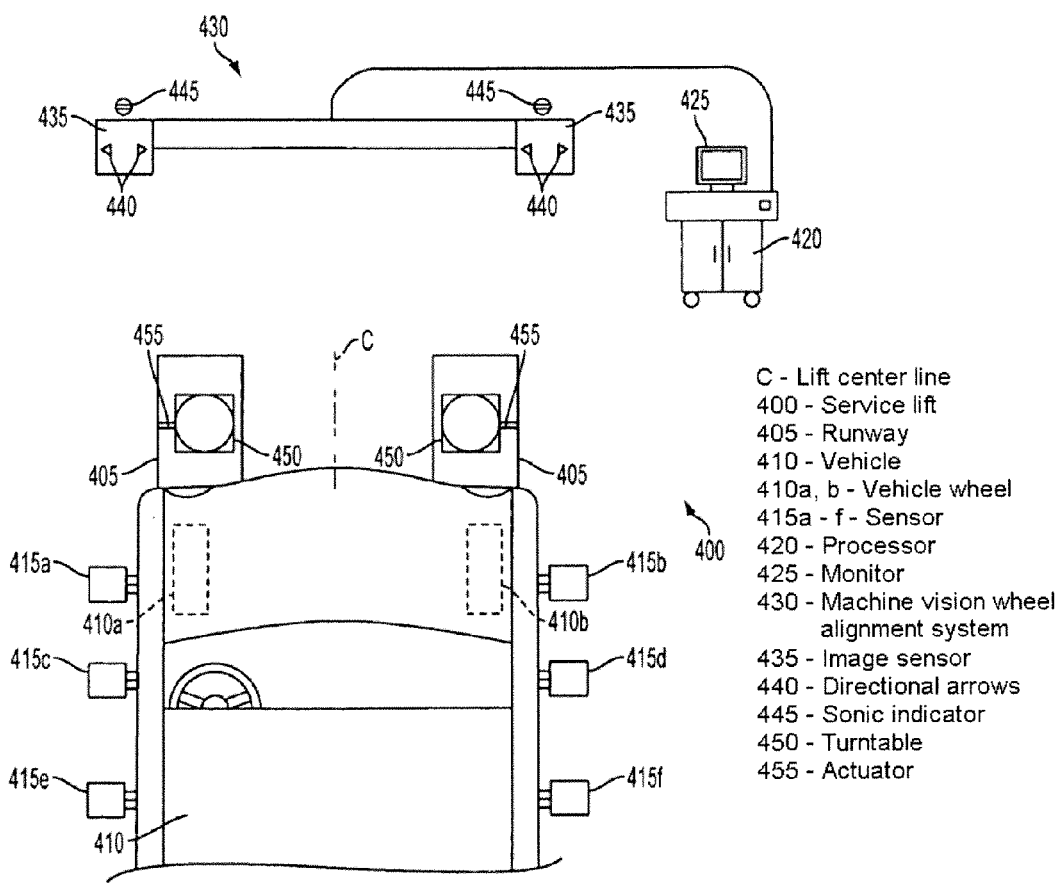
FIG. 4 diagrammatically illustrates an apparatus according to a still further additional embodiment of the present disclosure.

An apparatus according to a still further additional embodiment of the present disclosure will now be described with reference to FIG. 4. A service lift 400 has a pair of runways 405 for receiving the wheels of a vehicle 410. A plurality of sensors 415a-f is respectively attached to the runways 405 for generating a set of sensor signals responsive to a position of the vehicle 410 relative to the runways 405. Sensors 415a-f can include, for example, conventional video cameras, sonic sensors, and/or pressure (weight) sensors.

Sensors 415a-f are operably connected to a processor 420, such a computer, for receiving and processing the sensor signals. A monitor 425, such as a conventional video monitor, is operably connected to the processor 420. Processor 420 processes the sensor signals to determine and monitor the position of the vehicle 410 relative to the runways 405, and causes the monitor 425 to display a visual reference to guide an operator of the vehicle 410 to drive the vehicle wheels onto the runways 405.

In some embodiments, the visual reference displayed on the monitor 425 comprises graphical animations indicating the position of the vehicle relative to the runways. Alternatively, sensors 415a-f include at least one video camera, and the visual reference displayed on the monitor 425 comprises a video image of the vehicle relative to the runways. In other embodiments, the visual reference displayed on the monitor 425 includes directional arrows for providing feedback to guide the operator to drive the vehicle wheels onto the runways.

In further embodiments, the processor 420 is operably connected to a machine vision wheel alignment system 430 having image sensors 435, and the lift 400 is positioned in front of alignment system 430. The image sensors 435 each include a vehicle orientation directional indicator having selectively illuminated directional arrows 440, and the processor 420 is for causing the directional arrows 440 to illuminate responsive to the position of the vehicle 410 relative to the runways 405, for providing feedback to guide the operator. Other embodiments include sonic indicators 445, such as beepers or loudspeakers, operably connected to the processor 420, which causes the sonic indicators 445 to operate responsive to the position of the vehicle 410 relative to the runways 405 for providing feedback to guide the operator, such as beeps or voice commands synthesized in a conventional manner by the processor 420.

Referring again to FIG. 4, in another embodiment of the present disclosure, each of the runways 405 comprises a conventional turntable 450 movably mounted thereto. The vehicle wheels 410a are driven onto the turntables 450 to allow a technician to turn the wheels to the left and right when performing a wheel alignment. Since different vehicles have different wheel tracks (i.e., the distance between the front wheels), the turntables must be adjusted to the left or right to align the turntables to the particular vehicle's wheels prior to the wheels being driven onto them.

In this embodiment, an actuator 455, such as a conventional motor-driven screw drive actuator, is connected between each respective runway 405 and turntable 450 for moving the turntable relative to the runway to the left or right. The processor 420 controls the actuators 455 to move the turntables 450 responsive to the sensor signals such that the turntables are aligned with the vehicle wheels 410a. Those skilled in the art will appreciate that one way for the processor 420 to perform this function is for the processor to determine the position of the runways 405 and of the vehicle centerline C in a conventional manner (using sensor signals from the sensors 415a-f), and then reference a stored vehicle wheel track for the particular vehicle 410 to adjust turntables 450.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An apparatus for guiding a vehicle onto a service lift having a pair of runways for receiving the wheels of the vehicle, the apparatus comprising:
    a machine vision wheel alignment system having a first image sensor mounted to view a target on a first wheel of the vehicle, a first portion of the vehicle, and a first one of the runways; a processor for receiving and processing a first image signal from the first image sensor, and a monitor operably connected to the processor;
    wherein the processor is for processing the first image signal to generate a first image of the first portion of the vehicle and the first one of the runways, and displaying the first image on the monitor, to provide a visual reference to guide an operator of the vehicle to drive the vehicle wheels onto the runways.

2. The apparatus of claim 1, wherein the machine vision alignment system comprises a second image sensor mounted to view a target on a second wheel of the vehicle opposing the first wheel, a second portion of the vehicle, and a second one of the runways, and;
    wherein the processor is for receiving and processing a second image signal from the second image sensor to generate a second image of the second portion of the vehicle and the second one of the runways, and displaying the second image on the monitor.

3. The apparatus of claim 2, wherein the processor displays only one of the first and second images on the monitor at a time, the apparatus further comprising a switch for switching between display of the first and second images.

4. The apparatus of claim 2, wherein the processor is for displaying the first and second images on the monitor simultaneously.

5. An apparatus for guiding a vehicle onto a service lift having a pair of runways for receiving the wheels of the vehicle, the apparatus comprising:
- a pair of runway targets, each attached to one of the runways;
- a vehicle target attached to the vehicle;
- a machine vision wheel alignment system having a pair of image sensors for respectively viewing the pair of runway targets, wherein one of the image sensors is also for viewing the vehicle target, a processor for receiving and processing image signals from the image sensors, and a monitor operably connected to the processor;
- wherein the processor is for processing image signals resulting from the image sensors viewing the pair of runway targets to determine and store respective positions of the runways, for processing image signals resulting from the one of the image sensors viewing the vehicle target to monitor a position of the vehicle relative to the runways, and for causing the monitor to display a visual reference to guide an operator of the vehicle to drive the vehicle wheels onto the runways.

6. The apparatus of claim 5, comprising a pair of vehicle targets;
- wherein the pair of image sensors is for respectively viewing the pair of vehicle targets;
- wherein the processor is for processing image signals resulting from the pair of image sensors viewing the pair of vehicle targets to monitor the position of the vehicle relative to the runways.

7. The apparatus of claim 5, wherein the visual reference displayed on the monitor comprises graphical animations indicating the position of the vehicle relative to the runways.

8. The apparatus of claim 5, wherein the visual reference displayed on the monitor comprises a video image of the vehicle relative to the runways.

9. The apparatus of claim 5, wherein the visual reference displayed on the monitor comprises directional arrows for providing feedback to guide the operator.

10. The apparatus of claim 5, wherein the image sensors each include a vehicle orientation directional indicator having selectively illuminated directional arrows, and the processor is for causing the directional arrows to illuminate responsive to the position of the vehicle relative to the runways, for providing feedback to guide the operator.

11. The apparatus of claim 5, further comprising sonic indicators, wherein the processor IS for causing the sonic indicators to operate responsive to the position of the vehicle relative to the runways, for providing feedback to guide the operator.

* * * * *